US009453749B1

(12) United States Patent
Bachmann et al.

(10) Patent No.: US 9,453,749 B1
(45) Date of Patent: Sep. 27, 2016

(54) HYBRID SENSING ULTRASONIC FLOWMETER

(71) Applicant: Honeywell International Inc., Morristown, NJ (US)

(72) Inventors: David Bachmann, Ludwigshafen am Rhein (DE); Rolf Schmitt, Lambsheim (DE); Markus Hantzsch, Mommenheim (DE); Andreas Weber, Huettenberg (DE); Joern Hendrik Weber, Woelfersheim (DE)

(73) Assignee: Honeywell International Inc., Morristown, NJ (US)

( * ) Notice: Subject to any disclaimer, the term of this patent is extended or adjusted under 35 U.S.C. 154(b) by 34 days.

(21) Appl. No.: 14/643,849

(22) Filed: Mar. 10, 2015

(51) Int. Cl.
*G01F 1/66* (2006.01)

(52) U.S. Cl.
CPC .............. *G01F 1/667* (2013.01); *G01F 1/662* (2013.01)

(58) Field of Classification Search
USPC .............. 73/861.27, 861.25, 861.29, 861.31
See application file for complete search history.

(56) References Cited

U.S. PATENT DOCUMENTS

| | | | | |
|---|---|---|---|---|
| 4,024,760 A | * | 5/1977 | Estrada, Jr. ............. | G01P 5/245 73/861.31 |
| 4,646,575 A | * | 3/1987 | O'Hair ..................... | G01F 1/667 73/861.31 |
| 5,987,997 A | * | 11/1999 | Roskam ................... | G01F 1/668 73/861.29 |
| 6,595,070 B1 | * | 7/2003 | Cole ........................ | G01F 1/667 73/861.27 |
| 6,595,071 B1 | * | 7/2003 | Doten ...................... | A61B 8/06 73/861.29 |
| 2004/0011141 A1 | | 1/2004 | Lynnworth | |
| 2008/0141786 A1 | * | 6/2008 | von Klooster ........... | G01F 1/667 73/861.25 |
| 2010/0229654 A1 | | 9/2010 | Ao et al. | |
| 2011/0277558 A1 | | 11/2011 | Dietz et al. | |
| 2012/0125121 A1 | | 5/2012 | Gottlieb et al. | |
| 2016/0033312 A1 | * | 2/2016 | Ryu ......................... | G01F 1/662 73/861.27 |

FOREIGN PATENT DOCUMENTS

WO    2010056465 A1    5/2010

* cited by examiner

*Primary Examiner* — Jewel V Thompson
(74) *Attorney, Agent, or Firm* — Jetter & Associates, P.A.

(57) ABSTRACT

A hybrid ultrasonic flowmeter includes at least a first sensing plane including four ultrasonic transducers (transducers) positioned in a parallelogram arrangement on a meter pipe wall including a first and second transducer pair. A first reflector is positioned between the first transducer pair on a first portion of the meter pipe wall, and a second ultrasonic reflector is between the second transducer pair on a second portion of the meter pipe wall opposite the first wall portion. The transducers have assembly angles and emission patterns for emitting ultrasonic beams to provide a plurality of direct measurement paths and a plurality of reflective paths involving a first reflective path involving the first ultrasonic reflector and a second reflective path involving the second ultrasonic reflector. A flow electronics module including a transceiver causes the transducers to transmit ultrasonic signals and processes sensing signals generated by the transducers for determining a volume flow.

16 Claims, 4 Drawing Sheets

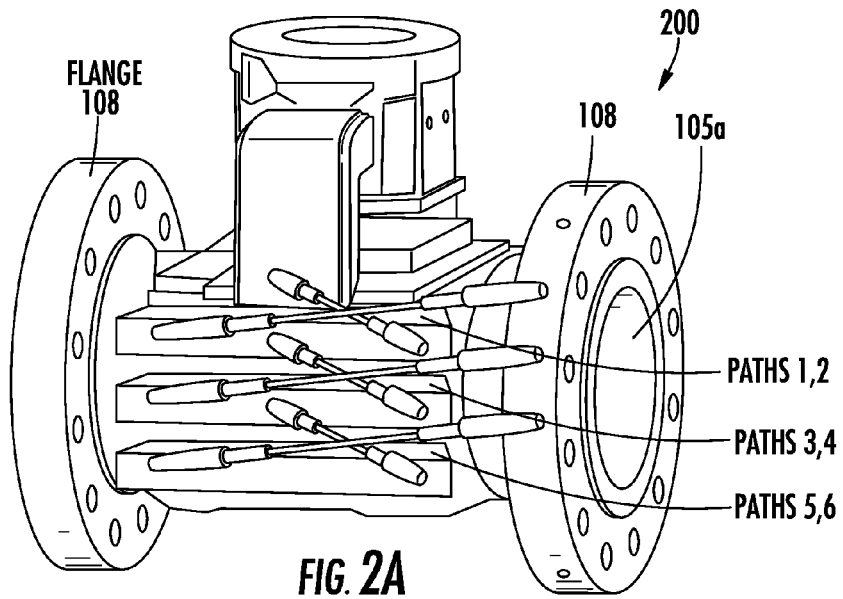
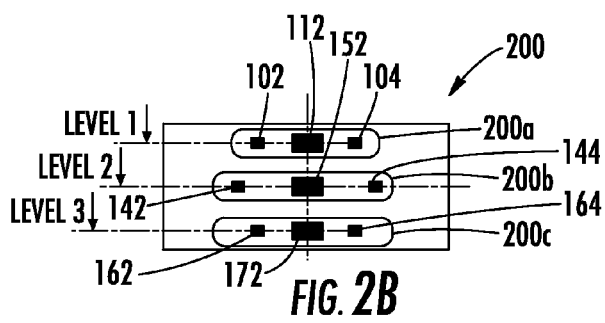 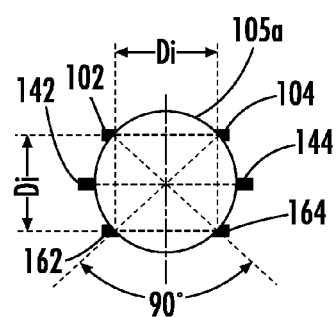
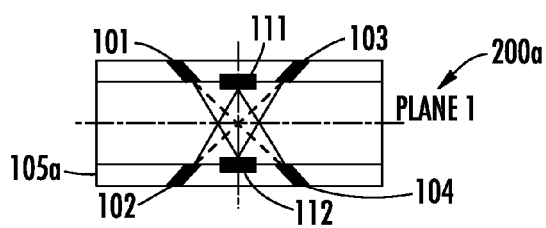 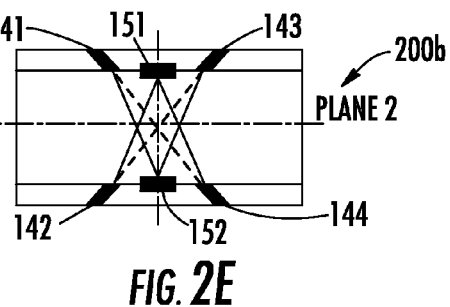
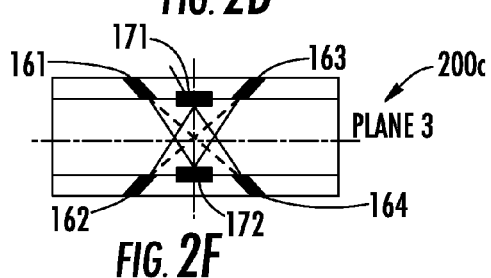

HYBRID SENSING ULTRASONIC FLOWMETER

FIELD

Disclosed embodiments relate to multi-path ultrasonic flowmeters.

BACKGROUND

Ultrasonic flowmeters are commonly used to determine the flow rate for a variety of fluids (e.g., liquids, gases) as well as the speed of sound in the fluid flowing in pipes having a variety of different sizes (e.g., 4-inch to 24-inch) and shapes. Knowledge of the flow rate of the fluid can enable other physical properties or qualities of the fluid to be determined. For example, in some custody-transfer applications, the flow rate can be used to determine the volume (Q) of a fluid (e.g., oil or gas) being transferred from a seller to a buyer through a pipe to determine the cost for the transaction, where the volume is equal to the flow rate multiplied by the cross-sectional area (A) of the pipe. In other applications, the speed of sound can be used to determine the mean molecular weight of a fluid flowing in a pipe to improve and/or control a chemical process or a combustion processes.

One type of ultrasonic flowmeter employs transit time flow metering, where one or more pairs of ultrasonic transducers are attached to a pipe (or a spool piece attached to a pipeline), where each transducer pair includes a transducer located upstream and a transducer located downstream from each other. Each transducer, when energized, transmits an ultrasonic beam or signal (e.g., a sound wave) along an ultrasonic path through the flowing fluid that is received by and is detected by the other transducer of the pair. The path velocity (i.e., path or chord velocity (Vp)) of the fluid averaged along an ultrasonic path can be determined as a function of the transit time differential between the transit time of an ultrasonic signal traveling along the ultrasonic path from the downstream transducer upstream to the upstream transducer against the fluid flow direction, and the transit time of an ultrasonic signal traveling along the ultrasonic path from the upstream transducer downstream to the downstream transducer along the fluid flow direction.

There are two different measurement principles used in known transit time ultrasonic flowmeters. A first type of ultrasonic flowmeter is a direct-path type that implements direct measuring using crossed paths between transducer (sensor) pairs, where there are no reflectors used. The ultrasonic transmitter and receiver for the direct-path type ultrasonic flowmeter are always located diagonally on opposite sides of the meter pipe wall. A second type of ultrasonic flowmeter is a reflective path type that implements indirect measuring paths using an ultrasonic reflector on the meter pipe wall opposite to the transducer pair to reflect the ultrasonic measurement signal received from the ultrasonic transmitter to the ultrasonic receiver, where the transducer pair is located at the same side of the meter pipe wall.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include hybrid ultrasonic flowmeters (hybrid flowmeters) which combine direct-path sensing and reflective (indirect) sensing in a single flowmeter realized by adding suitably placed reflector(s) to a direct-path ultrasonic flowmeter arrangement. In the direct-path, a portion of the transmitted signal is reflected by the opposite wall that can be detected at a second receiver next to the transmitter, forming a virtual reflective path. Reflectors placed on the meter pipe wall can be included to increase the efficiency of the reflective paths. Disclosed hybrid flowmeters realize an additional reflective path meter in a direct-path arrangement without the need to add any ultrasonic transducers.

Disclosed hybrid flowmeters comprise at least a first sensing plane including four ultrasonic transducers (transducers) positioned in a parallelogram arrangement on a meter pipe wall including a first and second transducer pair. A parallelogram is a 4-sided shape where opposite sides are parallel to one another. A rectangle is known in Euclidean plane geometry to be a special case of a parallelogram having adjacent sides which make right angles (90 degrees) to one another.

A first reflector is positioned between the first transducer pair on a first portion of the meter pipe wall, and a second ultrasonic reflector is between the second transducer pair on a second portion of the meter pipe wall opposite the first wall portion. The transducers have assembly angles and emission patterns (e.g., sufficiently wide emission angles) for providing a plurality of direct measurement paths including first and second direct measurement paths, and a plurality of reflective measurement paths including a first reflective path involving the first transducer pair and first ultrasonic reflector and a second reflective path involving the second transducer pair and second ultrasonic reflector. A flow electronics module including a transceiver, processor and a flow measurement algorithm causes the transducers to transmit ultrasonic signals and processes received sensing signals generated for determining a volume flow.

BRIEF DESCRIPTION OF THE DRAWINGS

FIG. 2A is a perspective depiction of an example hybrid flowmeter having three sensing planes each including four transducers positioned in a parallelogram arrangement on the meter pipe wall, according to an example embodiment.

FIG. 2B is a width-wise cross-sectional depiction of the example hybrid flowmeter shown in FIG. 2A, according to an example embodiment.

FIG. 2C is a length-wise cross sectional depiction of the example hybrid flowmeter shown in FIG. 2A.

FIG. 2D depicts a first sensing plane (plane 1) of the example hybrid flowmeter shown in FIG. 2A including four transducers positioned in a parallelogram arrangement on the meter pipe wall, along with reflectors, according to an example embodiment.

FIG. 2E depicts a second sensing plane (plane 2) of the example hybrid flowmeter shown in FIG. 2A including four transducers positioned in a parallelogram arrangement on the meter pipe wall, along with reflectors, according to an example embodiment.

FIG. 2F depicts a third sensing plane (plane 3) of the example hybrid flowmeter shown in FIG. 2A including four transducers positioned in a parallelogram arrangement on the meter pipe wall, along with reflectors, according to an example embodiment.

DETAILED DESCRIPTION

Figure 1:
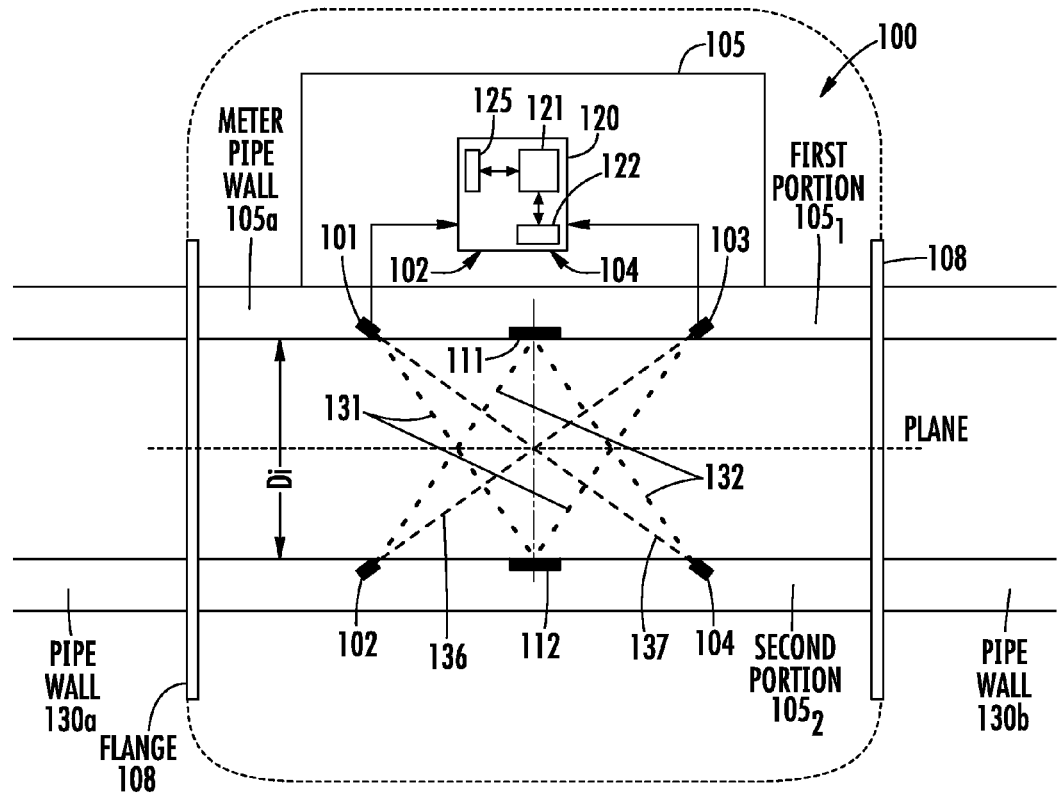
FIG. 1 depicts an example hybrid flowmeter shown installed between pipeline sections having a single sensing plane including four transducers positioned in a parallelogram arrangement on the meter pipe wall, along with reflectors, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 depicts an example hybrid flowmeter 100 shown installed between pipeline sections 130a and 130b (shown in FIG. 1 as "pipe wall") having a single sensing plane shown as a "plane" including four transducers 101, 102, 103 and 104 which are positioned in a parallelogram arrangement along the plane on the meter pipe wall 105a, along with first ultrasonic reflector 111 and second ultrasonic reflector 112, according to an example embodiment. Although the parallelogram arrangement shown in FIG. 1 and generally throughout this Disclosure is a rectangular arrangement, disclosed hybrid flowmeters are in no way limited to rectangular transducer arrangements, and can utilize different path angles to form a parallelogram.

Hybrid flowmeter 100 includes a meter body 105 including a meter pipe wall 105a. Connection flanges 108 are shown on each end of the hybrid flowmeter 200 for bolting the hybrid flowmeter 100 to the pipeline sections 130a and 130b.

Transducers 101 and 103 together provide a first transducer pair on a first portion $105_1$ of the meter pipe wall 105a having a first ultrasonic reflector 111 positioned between, and transducers 102 and 104 together provide a second transducer pair on a second portion $105_2$ of the meter pipe wall 105a opposite the first portion $105_1$ having a second ultrasonic reflector 112 positioned between. The first and second ultrasonic reflectors 111 and 112 are generally positioned on the inner side of the meter pipe wall 105a and function to increase the efficiency (ultrasonic signal intensity) of the reflective path for the respective transducer pairs. Disclosed reflectors are generally in the conventional form of metal plates.

The transducers 101, 102, 103 and 104 each have assembly angles and emission patterns (e.g., suitably wide emission angle) for providing the first direct measurement path 136 and the second direct measurement path 137 shown together forming an X pattern, and 2 reflective paths including a first single reflective path 131 in a V-pattern involving the first ultrasonic sensing pair comprising transducers 101 and 103 and the second reflector 112 and a second single reflective path 132 in a V-pattern involving the second transducer pair comprising transducers 102 and 104 and the first reflector 111. As noted above, this arrangement realizes additional reflective path flow sensing from a direct-path arrangement by adding reflectors without the need to add any transducers.

The flow electronics module 120 is shown including a processor 121 and an associated memory 122 that stores a flow measurement algorithm and a transceiver 125, which collectively provides an ultrasonic computer-based electronic flow measuring system that is coupled to the transducers 101, 102, 103 and 104 for causing the transducers to transmit ultrasonic signals and for analyzing received sensing signals generated by other transducers to determine a volume flow of a fluid flowing through the hybrid flowmeter 100. As used herein, a transducer can include a separate transmitter and receiver. Other flow electronics module electronics, such as signal amplifiers, filters, an analog-to-digital converter (ADC, in the receive circuitry) and digital-to-analog converter (DAC, in the transmit circuitry) are generally part of flow electronics module 120, but are not shown to provide simplicity. For every transmitted ultrasonic signal either a receiver of a direct-path or a receiver in reflective path can be active. It is also possible to receive signals from one or more direct-paths and one or more reflective paths simultaneously.

Hybrid flowmeter 100 can measure the flow velocity of the fluid flowing therethrough using the transit times of ultrasonic pulses, and flow electronics module 120 can calculate the flow rate at measurement conditions therefrom. Used is the fact that ultrasonic pulses move faster in the direction of flow than in the opposite direction against the flow.

During operation, each of the transducers 101, 102, 103 and 104 generally function as both an emitter (transmitter) and a receiver. Measurements are taken alternatively in both directions, so that after a transit time has been measured, an emitter becomes the receiver and vice versa. In this way, the impact of the velocity of sound which depends on the fluid type, pressure and temperature is eliminated.

Advantages of disclosed hybrid flowmeters such as hybrid flowmeter 100 which combine direct-path and reflective path sensing include increasing the total number of measurement paths without increasing the number of transducers, and providing a combination of different measurement (direct and reflective) methods in one flowmeter body. In addition, better swirl reduction is provided when using the reflective path-arrangement, and double sampling on different positions is also provided with each ultrasonic pulse.

In order to take the flow profile of the fluid in the pipeline into account, as known in the art measurements can be taken using a plurality of different sensing planes. FIG. 2A is a perspective depiction of an example hybrid flowmeter 200 having three sensing planes each including four transducers positioned in a parallelogram arrangement on the meter pipe wall 105a, according to an example embodiment. The reflectors on each sensing plane are not shown (see FIGS. 2B-2E described below). The direct sensing paths for the respective planes total 6 and are shown as paths 1 and 2, paths 3 and 4, and paths 5 and 6. Connection flanges 108 having the meter pipe wall 105a therein are shown on each end of the hybrid flowmeter 200 for bolting the hybrid flowmeter 200 to a pipeline.

FIG. 2B provides a width-wise cross-sectional depiction of the example hybrid flowmeter 200 shown in FIG. 2A, with the first sensing plane (first plane) 200a, second sensing plane (second plane) 200b and third sensing plane (third plane) 200c, each sensing plane including four transducers positioned in a parallelogram arrangement on a meter pipe wall, according to an example embodiment. For simplicity, the flow electronics module 120 and meter body 105 shown in FIG. 1 are not shown in FIGS. 2B-2E. In FIG. 2B, the first plane 200a shows transducers 102, 104 and reflector 112, the second plane 200b shows transducers 142, 144 and reflector 152, and the third plane 200c shows transducers 162, 164 and reflector 172.

The arrangement of direct-paths are generally according to Gauss-Chebyshev which provides high quality measurements of the flow velocity even in the case of asymmetries, swirl and crossflows. In addition, these variations of the ideal flow profile can also be measured, so that for example a flow diagnosis can be rendered.

FIG. 2C is a length-wise cross sectional depiction of the example hybrid flowmeter 200 shown in FIG. 2A. The inner diameter of the meter pipe wall 105a is shown ad Di. Being in a rectangular arrangement the direct-paths are shown making a 90 degree angle to one another, but as disclosed above can be at other angles, such as between 60 and 70 degrees to one another.

Disclosed transducers can be directly attached to the meter body 105 of the hybrid flowmeter such as through flanges (not shown). The position of the transducer tips in relation to the meter pipe wall 105a can vary so that the transducer tips can be recessed from or also extend into the meter pipe. It is not necessary that the position of the planes is symmetrical to the axis of the meter body 105.

FIG. 2D depicts the first plane 200a (plane 1) of the hybrid flowmeter 200 showing all four transducers 101, 102, 103 and 104 in a parallelogram arrangement on the meter pipe wall 105a as well as both of its reflectors 111 and 112. FIG. 2E depicts the second plane 200b (plane 2) of the hybrid flowmeter 200 showing all four transducers 141, 142, 143 and 144 in a parallelogram arrangement on the meter pipe wall 105a as well as both of its reflectors 151 and 152. In this embodiment, the reflectors 151, 152 are optional since only when a path does not cross the center axes of the meter body, a reflector is generally necessary, as signals which are reflected in the center plane will typically have a low scattering effect. FIG. 2F depicts the third plane 200c (plane 3) of the hybrid flowmeter 200 showing all four transducers 161, 162, 163 and 164 in a parallelogram arrangement on the meter pipe wall 105a as well as both of its reflectors 171 and 172.

Figure 3A:
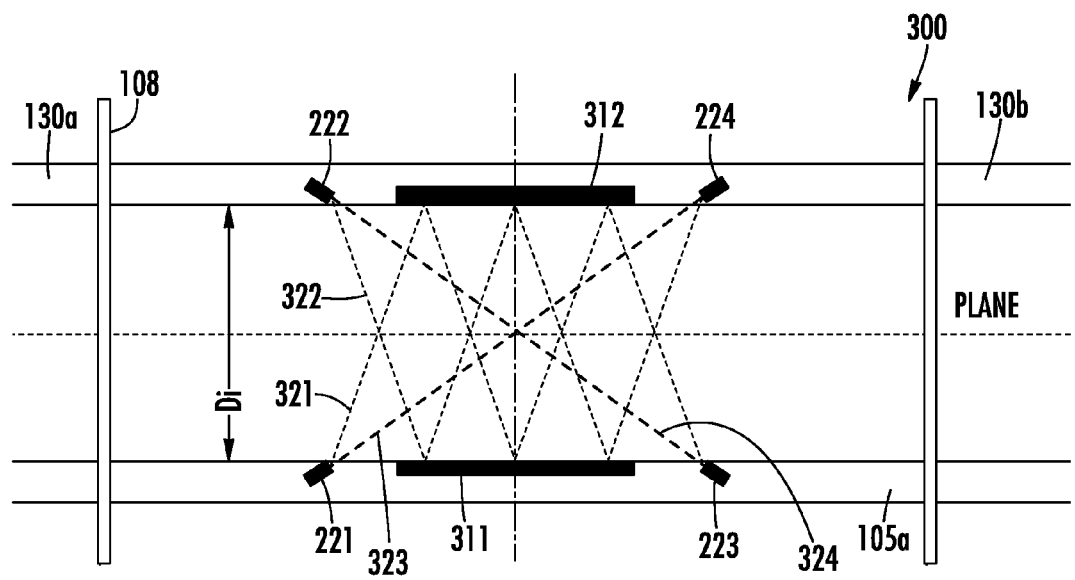
FIG. 3A depicts a sensing plane of an example hybrid flowmeter that combines 2 multi-reflective paths (3 reflections each) and 2 direct-paths, according to an example embodiment.

FIG. 3A depicts a sensing plane 300 of a hybrid flowmeter that is shown having transducers 221a, 222a, 223a, and 224a and reflectors 311 and 312 combining 2 multi-reflective paths (3 reflections each) shown as 321 and 322, and 2 direct-paths shown as 323 and 324. In comparison, the sensor planes described above, such as the first plane 200a, second plane 200b, and third plane 200c of the hybrid flowmeters 200 described above, each provide 2 single-reflective paths and 2 direct-paths.

Figure 3B:
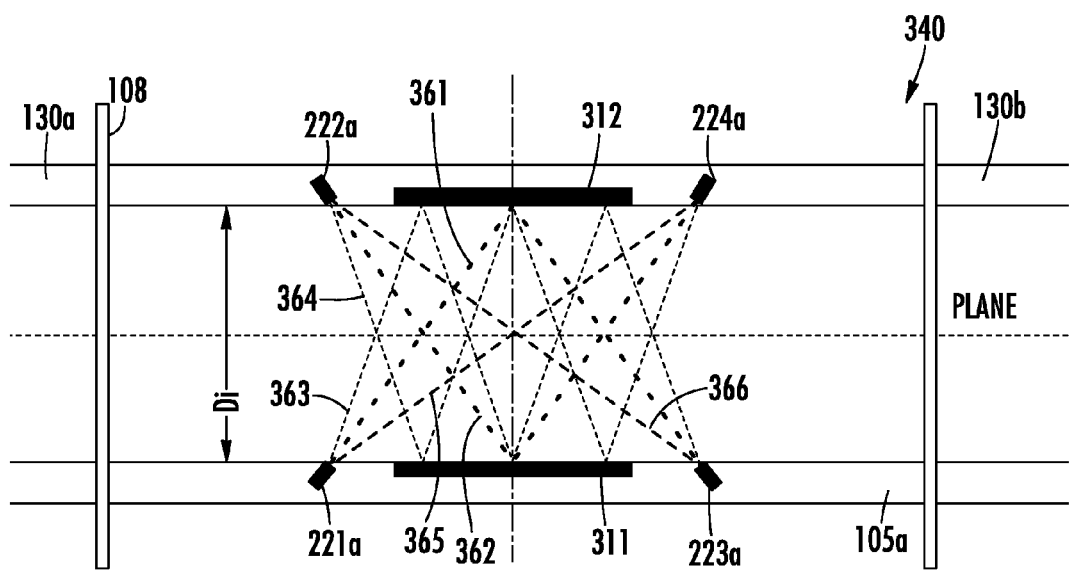
FIG. 3B depicts a sensing plane of an example hybrid flowmeter that combines 2 single-reflective paths, 2 multi-reflective paths and 2 direct-paths, according to an example embodiment.

FIG. 3B depicts a sensing plane 340 of a hybrid flowmeter that combines 2 single-reflective paths shown as 361 and 362, 2 multi-reflective paths shown as 363 and 364, and 2 direct-paths shown as 365 and 366. In this embodiment the transducers 221a, 222a, 223a, and 224a have radiation characteristics configured to transmit a wide angle of transmission ultrasonic beam to provide the respective reflective paths along with the direct-paths shown.

As demonstrated above by FIGS. 3A-3B, by favoring the angles of the transducers for the simple reflective path arrangement it is possible to double the reflective path arrangement, to obtain a W/M multi-reflective path arrangement without the loss of the direct direct-paths. A path multiplication by 3 is shown as being possible. Further path multiplications are obtainable depending on the radiation characteristics of the transducers.

Figure 3C:
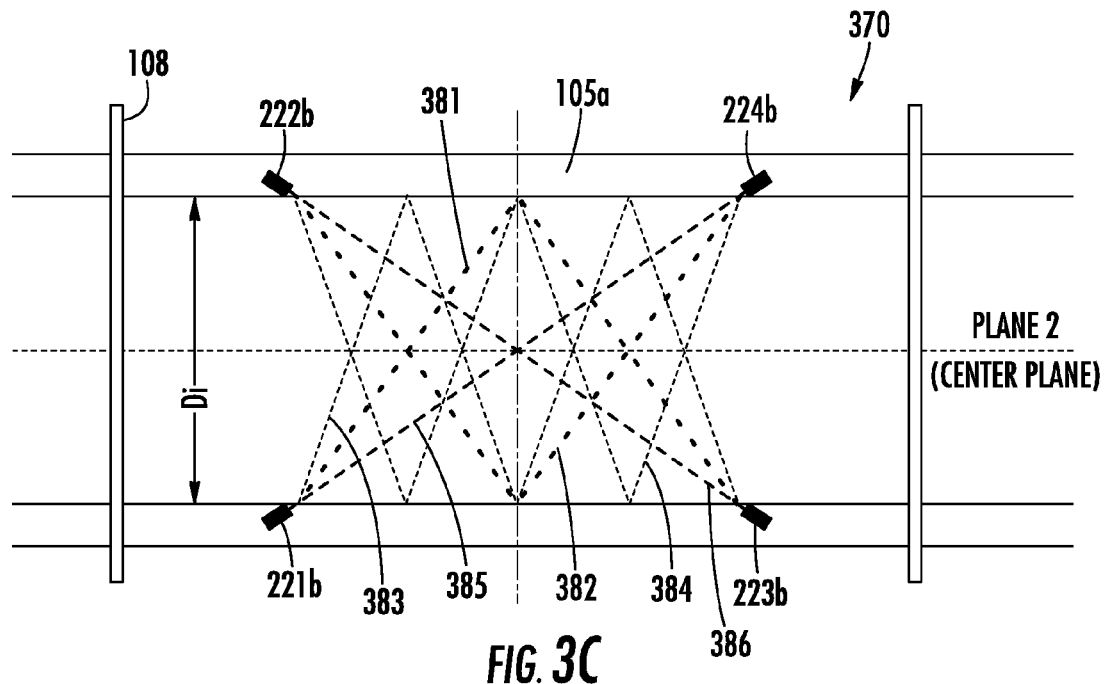
FIG. 3C depicts an inner sensing plane (e.g. plane 2 in a 3 plane hybrid flowmeter) of an example hybrid flowmeter that combines 2 single-reflective paths, 2 multi-reflective paths, and 2 direct-paths, according to an example embodiment.

FIG. 3C depicts an inner sensing plane 370 (e.g. plane 2 in a 3 plane hybrid flowmeter) of a hybrid flowmeter that combines 2 single-reflective paths shown as 381 and 382, 2 multi-reflective paths shown as 383 and 384, and 2 direct-paths shown as 385 and 386. In this embodiment the reflectors 311 and 312 shown in FIGS. 3A and 3B are not needed due to signals in the center plane having as low scattering effect, and the transducers 221b, 222b, 223b, and 224b in sensing plane 340 in FIG. 3B each transmit a wide angle of transmission ultrasonic beam to allow the single reflective paths, multi-reflective paths along with the 2 direct-paths.

Figure 4:
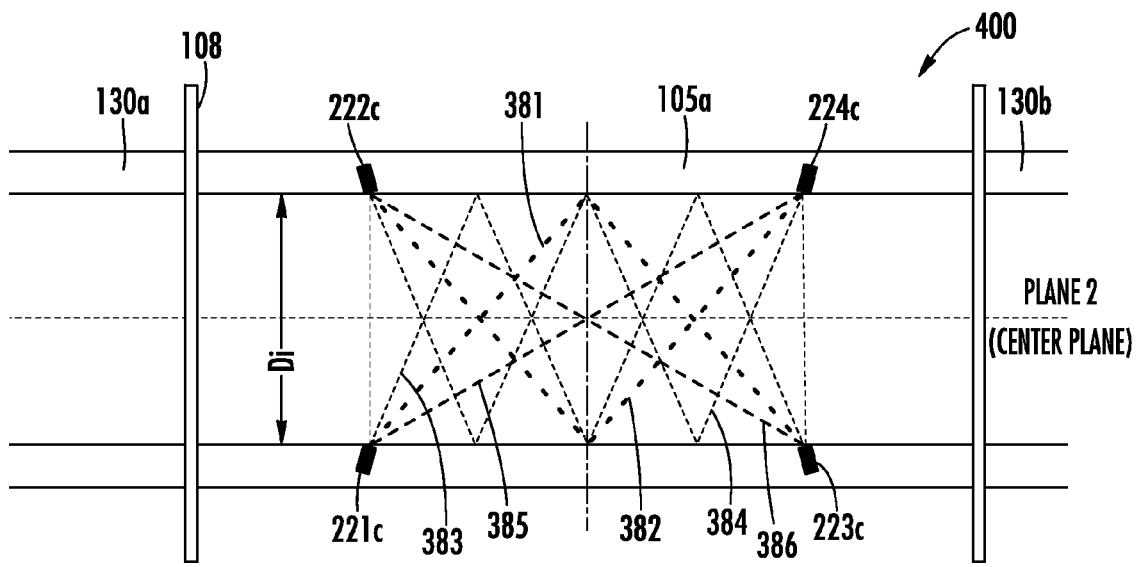
FIG. 4 depicts an inner sensing plane (e.g., plane 2 in a 3 sensing plane embodiment) of an example hybrid flowmeter that combines 2 single-reflective paths, 2 multi-reflective paths, 2 direct-paths, and 2 0°-direct-path, according to an example embodiment.

FIG. 4 depicts an inner sensing plane 400 (e.g. plane 2 in a 3 plane embodiment) of a hybrid flowmeter having transducers 221c, 222c, 223c, and 224c that combines the 2 single-reflective paths 381 and 382, 2 multi-reflective paths 383 and 384, and 2 direct-paths 385 and 386 shown in FIG. 3C, along with 2 additional 0°-direct-paths, according to an example embodiment. Advantages of including 0° paths include enabling further diagnostics including measuring the speed of sound or to calculate the path arrangements (path length, axial distance) with a linear equation system.

Reception of either direct or reflected signals can generally be realized using existing flowmeter electronics. For the simultaneous reception of both direct and reflected signals the ultrasonic meter electronics can be extended to include known multi-receiver signal processing functionality, such as one receiver for receiving direct signals and one receiver for receiving reflected signals. Time division multiplexing (TDM) may also be used to enable a single receiver to receive both direct signals and reflected signals.

Disclosed hybrid sensing can be extended from a single plane to any number of planes. Disclosed hybrid flowmeters have several significant advantages. One advantage is realizing additional reflective path meters in a direct-path arrangement without the need for any additional transducers. Applied to custody transfer meter applications, disclosed hybrid flowmeters provide the advantage of extending the recalibration period which can provide a decreased number of needed recalibrations in a flowmeter lifetime. Recalibration is known to be a cost intensive process for the customer because the flowmeter has to be demounted from the pipeline and then sent to a calibration lab. Another advantage is by adding a check reflective path or multiple redundant reflective paths to a direct-path arrangement leads to increased meter accuracy when additional flow data obtained from the redundant flowmeter paths provided is included in main flow measurement.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A hybrid ultrasonic flowmeter (hybrid flowmeter), comprising:
a meter body including a meter pipe wall;
at least a first sensing plane including at least four ultrasonic transducers (transducers) positioned in a parallelogram arrangement on said meter pipe wall including a first transducer pair and a second transducer pair;
a first ultrasonic reflector positioned between said first transducer pair on a first portion of said meter pipe wall (first wall portion), and a second ultrasonic reflector between said second transducer pair on a second portion of said meter pipe wall opposite said first wall portion;
said four transducers having assembly angles and emission patterns for emitting an ultrasonic beam to provide a plurality of direct measurement paths including at least a first and second direct measurement path and a plurality of reflective paths including at least a first reflective path involving said first transducer pair and said first ultrasonic reflector and a second reflective path involving said second transducer pair and said second ultrasonic reflector, and
a flow electronics module including a transceiver coupled to a processor having an associated memory storing a flow measurement algorithm coupled to said four transducers for causing said four transducers to transmit ultrasonic signals, for receiving sensing signals generated by said four transducers, and for determining a volume flow of a fluid flowing through said hybrid flowmeter.

2. The hybrid flowmeter of claim 1, wherein said assembly angles and emission patterns are configured for said first reflective path and said second reflective path to both be single-reflective paths.

3. The hybrid flowmeter of claim 1, wherein said assembly angles and emission patterns are configured for said first reflective path and said second reflective path to both be multi-reflective paths.

4. The hybrid flowmeter of claim 1, wherein said assembly angles and emission patterns are configured for said plurality of reflective paths to include both single-reflective paths and multi-reflective paths.

5. The hybrid flowmeter of claim 1, wherein said at least a first sensing plane further includes a second said sensing plane (second sensing plane), and a third said sensing plane (third sensing plane), said first, second and third sensing planes being parallel to one another.

6. The hybrid flowmeter of claim 5, wherein only said second sensing plane excludes said first ultrasonic reflector and said second ultrasonic reflector.

7. The hybrid flowmeter of claim 1, wherein said assembly angles and emission patterns are configured for said plurality of direct measurement paths to include both diagonal paths and 0° paths.

8. The hybrid flowmeter of claim 1, wherein said flow electronics module includes receiver concurrent multi-signal processing functionality for simultaneously processing data from said plurality of reflective paths and data from a plurality of direct-paths.

9. A method of ultrasonic flow sensing, comprising:
providing a hybrid ultrasonic flowmeter (hybrid flowmeter) between pipeline sections having a fluid flowing therethrough including at least four ultrasonic transducers (transducers) providing at least a first sensing plane including a plurality of reflective paths and a plurality of direct-paths;
flow sensing using said plurality of reflective paths;
flow sensing using said plurality of direct-paths, and
utilizing data obtained from said flow sensing using said plurality of reflective paths together with data obtained from said flow sensing using said plurality of direct-paths.

10. The method of claim 9, wherein said four transducers are positioned in a parallelogram arrangement on a meter pipe wall including a first transducer pair and a second transducer pair, a first ultrasonic reflector positioned between said first transducer pair on a first portion of said meter pipe wall (first wall portion), and a second ultrasonic reflector between said second transducer pair on a second portion of said meter pipe wall opposite said first wall portion, said four transducers having assembly angles and emission patterns for emitting an ultrasonic beam to provide said plurality of direct-paths including a first and second direct measurement path and said plurality of reflective paths including a first reflective path involving said first transducer pair and said first ultrasonic reflector and a second reflective path involving said second transducer pair and said second ultrasonic reflector.

11. The method of claim 9, wherein said at least a first sensing plane further includes a second said sensing plane (second sensing plane), and a third said sensing plane (third sensing plane), said first, second and third sensing planes being parallel to one another.

12. The method of claim 10, wherein said first reflective path and said second reflective path are single-reflective paths.

13. The method of claim 10, wherein said first reflective path and said second reflective path are multi-reflective paths.

14. The method of claim 9, wherein said plurality of reflective paths include both single-reflective paths and multi-reflective paths.

15. The method of claim 9, wherein said plurality of direct-paths include both diagonal paths and 0° paths.

16. The method of claim 9, wherein said utilizing data comprises simultaneously processing data from said plurality of reflective paths and data from said plurality of direct-paths.

* * * * *